J. W. WOODRUFF.
Device for Transmitting Power.
No. 168,701.
Patented Oct. 11, 1875.
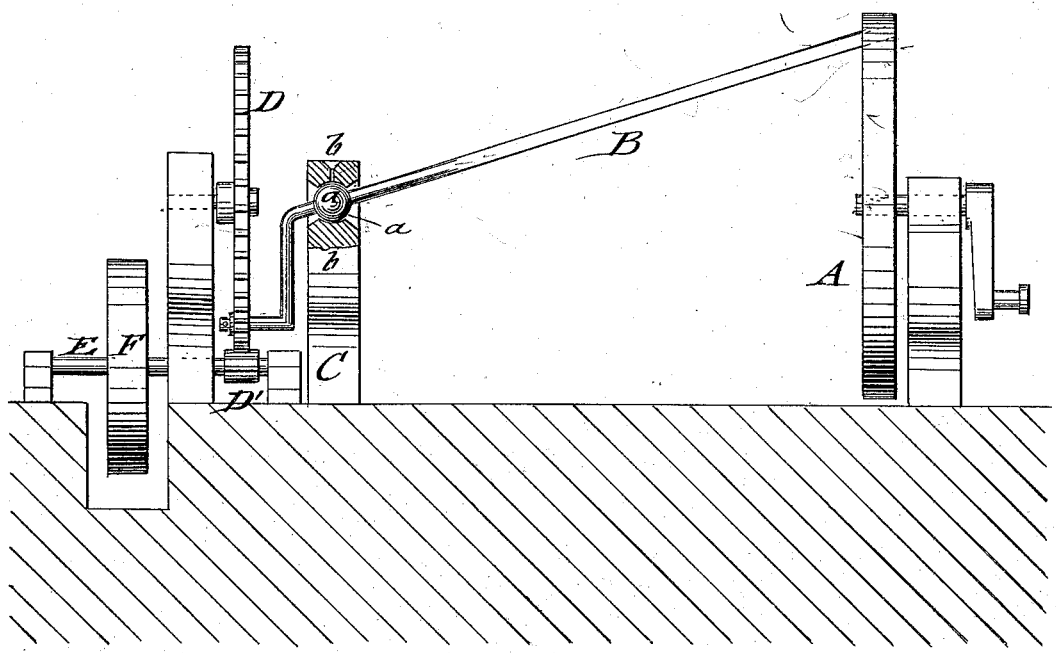

UNITED STATES PATENT OFFICE.

JOHN WESLEY WOODRUFF, OF JOLLYTOWN, PENNSYLVANIA.

IMPROVEMENT IN DEVICES FOR TRANSMITTING POWER.

Specification forming part of Letters Patent No. 168,701, dated October 11, 1875; application filed August 28, 1875.

*To all whom it may concern:*

Be it known that I, JOHN W. WOODRUFF, of Jollytown, in the county of Greene and State of Pennsylvania, have invented a new and Improved Device for Transmitting Power, of which the following is a specification:

The accompanying drawing represents a side elevation of my improved device for transmitting power.

The object of my invention is to provide a device by which the power of an engine is transmitted from the fly-wheel of the same to some distance from the engine, to be then applied directly to the machinery, to be driven thereby and produce an easier and uniform running of the same.

The invention consists of the connection of the fly-wheel by a long crank-lever, of which one end is fixed to a point near the circumference of the fly-wheel, while the other crank-shaped end turns a large spur-wheel that intermeshes with a pinion of a shorter shaft with transmitting-pulley, the transmitting-lever turning by a ball-journal in socket-bearings near the crank end.

In the drawing, A represents the fly-wheel, which is rotated by the driving-shaft of any suitable engine. A transmitting-lever, B, of suitable length, is rigidly fixed to a point near the circumference of the fly-wheel and bent at its opposite end in the shape of a crank, a ball-journal, $a$, near the point where the crank begins, turning in a socket-bearing, $b$, of a supporting-standard, C, and being lubricated in suitable manner through an oil-hole from above, as shown in the drawing. The crank end is applied to a large spur-wheel, D, near the circumference of the same, which spur-wheel meshes with a small pinion, $D'$, and revolves the same rapidly in connection with the large spur-wheel. The shaft E of the pinion turns in suitable bearings, and has one or more pulleys, F, from which, by belt connection, the power is transmitted to the machinery to be driven at some distance from the engine.

If it is desired to run other machinery in proximity to the crank end, two additional lever-rods may be placed on the short shaft of the crank end that is attached to the large spur-wheel. The lever-rods, being arranged in opposite direction, are revolved therewith, and drive two more wheels at their ends, so that the power of the engine is thereby, by very simple and effective attachments, utilized without requiring expensive transmissions, which is of considerable advantage for small engines, as it reduces the expense connected with the fitting up of the same.

The longer the transmitting-lever the easier and smoother will be the motion of the driving-pulleys and levers, and the more advantageous will be the employment of the device for certain purposes.

Having thus described my invention, I claim as new and desire to secure by Letters Patent—

The combination, shown and described, of drive-wheel A, crank-rod B, and driven wheel D, the crank-rod being attached to the circumference of each wheel and held intermediately by a ball-joint in a bearing, $b$, as and for the purpose specified.

JOHN WESLEY WOODRUFF.

Witnesses:
J. T. EICHELBERGER,
WM. R. SNODGRASS.